United States Patent
Mizutani et al.

(10) Patent No.: US 7,772,734 B2
(45) Date of Patent: Aug. 10, 2010

(54) ROTOR STRUCTURE OF ROTATING ELECTRIC MACHINE

(75) Inventors: Tatsuhiko Mizutani, Toyota (JP); Toshiya Sugiyama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/667,877

(22) PCT Filed: Jan. 10, 2006

(86) PCT No.: PCT/JP2006/000412

§ 371 (c)(1), (2), (4) Date: May 16, 2007

(87) PCT Pub. No.: WO2006/075727

PCT Pub. Date: Jul. 20, 2006

(65) Prior Publication Data

US 2007/0290565 A1     Dec. 20, 2007

(30) Foreign Application Priority Data

Jan. 12, 2005   (JP) ............................ 2005-005495

(51) Int. Cl.
*H02K 21/12*    (2006.01)
(52) U.S. Cl. ............... 310/156.53; 310/65; 310/156.28; 310/156.29; 310/179; 310/156.56
(58) Field of Classification Search .......... 310/65, 310/156.53, 179, 156.56, 156.28, 156.29; *H02K 21/12*
See application file for complete search history.

(56) References Cited

U.S. PATENT DOCUMENTS

| | | | | |
|---|---|---|---|---|
| 464,026 A | * | 12/1891 | Kammeyer | 310/264 |
| 891,273 A | * | 6/1908 | Lord et al | 310/216.125 |
| 1,925,892 A | * | 9/1933 | Apple et al. | 310/43 |
| 3,038,093 A | * | 6/1962 | Needham et. al. | 310/179 |
| 5,162,686 A | * | 11/1992 | Royer | 310/156.59 |
| 5,175,461 A | * | 12/1992 | Zigler et al. | 310/156.28 |
| 5,747,909 A | * | 5/1998 | Syverson et al. | 310/156.56 |
| 5,889,342 A | * | 3/1999 | Hasebe et al. | 310/54 |
| 6,229,243 B1 | * | 5/2001 | Roesel et al. | 310/261 |
| 6,342,745 B1 | * | 1/2002 | Sakai et al. | 310/156.56 |
| 6,424,069 B1 | * | 7/2002 | Pullen et al. | 310/156.38 |
| 6,845,617 B1 | * | 1/2005 | Allen et al. | 60/607 |

(Continued)

FOREIGN PATENT DOCUMENTS

JP           11-098733 A           7/1999

(Continued)

OTHER PUBLICATIONS

*Modern Permanent Magnet Machines—Theory and Design*, 1997, pp. 4-6.

Primary Examiner—Quyen Leung
Assistant Examiner—John K Kim
(74) Attorney, Agent, or Firm—Kenyon & Kenyon LLP

(57) ABSTRACT

A rotor includes a rotor core and disk-shaped end plates provided to sandwich the rotor core in the direction of a rotation shaft. The end plates are each formed to have one end face relatively closer to the rotor core and larger in outer diameter with the center at the rotation shaft than the other end face.

8 Claims, 1 Drawing Sheet

U.S. PATENT DOCUMENTS

| | | | |
|---|---|---|---|
| 6,933,633 B2 * | 8/2005 | Kaneko et al. | 310/52 |
| 2002/0047426 A1 * | 4/2002 | Pop, Sr. | 310/156.08 |
| 2002/0140309 A1 * | 10/2002 | Yanashima et al. | 310/162 |
| 2003/0020351 A1 * | 1/2003 | Lee et al. | 310/156.53 |
| 2003/0057801 A1 * | 3/2003 | Zeller et al. | 310/270 |
| 2003/0218399 A1 * | 11/2003 | Iles-Klumpner | 310/156.53 |
| 2004/0145263 A1 * | 7/2004 | Kojima et al. | 310/156.23 |
| 2004/0256940 A1 * | 12/2004 | Tsuruta et al. | 310/156.53 |
| 2005/0156474 A1 * | 7/2005 | Endo | 310/156.53 |
| 2005/0285468 A1 * | 12/2005 | Fukushima et al. | 310/156.53 |
| 2007/0103023 A1 * | 5/2007 | Tapper | 310/156.19 |

FOREIGN PATENT DOCUMENTS

| | | |
|---|---|---|
| JP | 2001-016810 A | 1/2001 |
| JP | 2001-231198 A | 8/2001 |
| JP | 2003-134705 A | 5/2003 |

* cited by examiner

ROTOR STRUCTURE OF ROTATING ELECTRIC MACHINE

This is a 371 national phase application of PCT/JP2006/300412 filed 10 Jan. 2006, which claims priority of Japanese Patent Application No. 2005-005495 filed 12 Jan. 2005, the contents of which are incorporated herein by reference.

TECHNICAL FIELD

The present invention relates to a rotor structure of a rotating electric machine, and particularly to a structure of a rotor that is formed by sandwiching a rotor core between end plates in the direction of the rotation shaft.

BACKGROUND ART

Regarding a conventional rotating electric machine comprised of a rotor and a stator, the stator is made up of a stator core having a plurality of slots formed therein and a coil whose wire is wound around teeth provided between the slots. The rotor is made up of a rotor core having a plurality of electromagnetic steel plates stacked on each other, a permanent magnet generating a magnetic force, and a shaft serving as a rotation shaft. Electric power is supplied to the coil to cause magnetic fields to be generated. According to the generated magnetic fields, a flow of magnetic flux is generated between the rotor and the stator, thereby providing a rotational force to the rotor. In the rotor, the permanent magnet is inserted into an opening provided in the rotor core. End plates are provided to sandwich the rotor core in the direction of the rotation shaft of the rotor.

As a rotating electric machine structured in the above-described manner, Japanese Patent Laying-Open No. 2003-134705, for example, discloses a rotor structure of an electric motor having end plates made of a magnetic material and preventing short-circuit of magnetic flux generated from terminals of a permanent magnet. This electric motor has its rotor structure including, around its rotation shaft, a rotor iron core structured by stacking a plurality of magnetic elements in the axial direction of the rotation shaft and rotating together with the rotation shaft, and including therearound, end plates provided on both sides with respect to the axial direction of the rotation shaft of the rotor iron core for holding the rotor iron core. In the rotor iron core and end plates, a through hole into which the permanent magnet is inserted is provided in the axial direction of the rotation shaft. The permanent magnet has its end faces in the axial direction of the rotation shaft that are substantially coplanar with respective outer faces of the end plates in the same axial direction.

Regarding the rotor structure of the electric motor disclosed in the aforementioned publication, the end faces of the permanent magnet in the axial direction of the rotation shaft are substantially coplanar with respective outer faces of the end plates in the same axial direction. Therefore, even when the end plates are made of a magnetic material, the magnetic flux generated from the vicinity of the terminals of the permanent magnet is directed through the end plates toward the stator located around the rotor. Thus, short circuit of the magnetic flux can be prevented. While short circuit of the magnetic flux is prevented, the end plates can be made of a magnetic material and accordingly an increase in material cost can be avoided.

Since the rotor is provided opposite to the stator, there arises a problem of a short distance between the end plates provided on respective ends of the rotor in the direction of the rotation shaft and the coil ends of the coil wound around the stator core. As electric power is supplied to the coil while the rotating electric machine is operating, an insufficient distance between the end plates and the coil ends causes arc discharge to be generated, resulting in the possibility of peeling of an insulating coating of the coil due to heat generated by the discharge. In the rotor structure disclosed in the aforementioned publication, the distance between the end plates and the coil ends is not taken into consideration. Therefore, such a problem as described above still could arise.

Further, for the purpose of keeping an appropriate distance between the end plates and the coil ends, the end plates may be made thinner or the outer diameter of the end plates may be reduced. However, if the end plates are made thinner, the strength of the whole end plates deteriorates to weaken the force of holding the rotor core. Further, if the outer diameter of the end plates is decreased, the force exerted by the end plates on the rotor core is not uniform. In particular, when the rotor core is made up of a plurality of electromagnetic steel plates, the electromagnetic steel plates could deform.

DISCLOSURE OF THE INVENTION

An object of the present invention is to provide a rotor structure of a rotating electric machine, ensuring insulation between the end plates and the coil ends.

Another object of the present invention is to provide a rotor structure of a rotating electric machine, ensuring the force of holding the rotor core.

According to an aspect of the present invention, a rotating electric machine has a rotor and a stator. The rotor includes a rotor core and disk-shaped end plates provided to sandwich the rotor core in the direction of a rotation shaft. The end plates are each formed to have a first end face closer to the rotor core and larger in outer diameter than a second end face.

According to the present invention, the disk-shaped end plates are each formed to have the first end face closer to the rotor core and larger in outer diameter than the second end face, and accordingly respective outer diameters of the end plates can be made smaller on respective ends of the rotor. In this way, the distance can be increased between the end plates and the coil ends of the coil wound around the stator core provided opposite to the rotor. Thus, the end plates can be formed at a distance from the coil ends that does not deteriorate the insulation so as to ensure the insulation between the coil and the end plates. Accordingly, the rotor structure of the rotating electric machine ensuring the insulation between the end plates and the coil ends can be provided.

Preferably, the rotor further includes a permanent magnet inserted into each of openings formed to be arranged in the circumferential direction of the rotor core. The end plates are each formed to have the first end face with its outer diameter larger with respect to a circumferentially outermost position of the openings.

According to the present invention, the outer diameter of the first end face of the end plates is formed to be larger with respect to the circumferentially outermost position of the openings provided in the rotor core. In particular, in the case where the rotor core is formed of a plurality of electromagnetic steel plates, the end plates exert a force in the compressing direction along the rotation shaft while sandwiching the rotor core, thereby holding the shape of the rotor core. When the rotor core is sandwiched, the force in the compressing direction is exerted on the circumferentially inner portion of the rotor core that is located inside the peripheral portion of the end plates, while the force in the compressing direction is not exerted on the circumferentially outer portion of the rotor core. Therefore, if the outer diameter of the end plates is small, the circumferentially outer portion of the electromagnetic steel plates could be deformed to warp. In the electromagnetic steel plates, the openings into which the permanent magnet is inserted are provided. Thus, the outer diameter of the end plates can be formed to be larger with respect to the circumferentially outermost position of the openings provided in the rotor core, so as to prevent deformation of the low-strength portion of the electromagnetic steel plates where the openings are formed, and exert the holding force on the end faces of the rotor core. Accordingly, the rotor structure of the rotating electric machine ensuring the force of holding the rotor core can be provided.

Still preferably, the end plates are each formed to have the second end face with its outer diameter larger with respect to the circumferentially outermost position of the openings.

According to the present invention, the second end face of the end plates is formed to have the outer diameter larger with respect to the circumferentially outermost position of the openings provided in the rotor core. In the case where the rotor core is formed of a plurality of electromagnetic steel plates, the end plates exert a force in the compressing direction along the rotation shaft while sandwiching the rotor core so as to hold the shape of the rotor core and the permanent magnet. Therefore, the outer diameter of the second end face can be formed to be larger with respect to the circumferentially outermost position of the openings provided in the rotor core so as to prevent deterioration in strength of the end plates in the region at least from the center of the shaft to the circumferentially outermost position of the openings and to maintain the force of holding the rotor core and the permanent magnet.

Still more preferably, a coil is wound around a core of the stator. The end plates are formed to have at least a predetermined distance from a coil end of the coil.

According to the present invention, the end plates are formed to have at least a predetermined distance from the coil ends of the coil wound around the stator core. For example, the end plates can be formed to have a distance from the coil ends that does not deteriorate insulation so as to ensure the insulation between the coil ends and the end plates.

Still more preferably, a portion between the first end face and the second end face is formed to have an outer diameter that gradually changes.

According to the present invention, the portion between the first and second end faces is formed to have the outer diameter that gradually changes. Accordingly, the end plates can be formed to keep the distance from the coil ends that does not deteriorate the insulation and to have strength necessary for holding the rotor core.

Still more preferably, a connecting portion between each of the first and second end faces and an outer peripheral surface of a portion between the first and second end faces is formed to have a curved surface.

According to the present invention, the connecting portion between each of the first and second end faces of the end plate and the outer peripheral surface between the first and second end faces is formed to have a curved surface. If a sharp edge is formed between the first and second end faces each of the end plate and the outer peripheral surface of the end plate, spark could be generated from a powered coil toward the sharp edge. Therefore, the connecting portions of the end plates can be formed to have the curved surface so as to prevent generation of spark. Accordingly, the insulating coating of the coil can be prevented from peeling due to heat generated from the spark.

Still more preferably, the rotor core is formed by stacking a plurality of electromagnetic steel plates.

According to the present invention, the invention can be applied to a rotor core formed by stacking a plurality of electromagnetic steel plates so as to ensure the force of holding the rotor core without deforming the electromagnetic steel plates while keeping the distance between the end plates and the coil ends to the degree that does not deteriorate the insulation.

Still more preferably, an insulating member is attached to an outer rim of the end plates.

According to the present invention, the insulating member is attached to the outer rim of the end plates so as to improve the insulation between the end plates and coil ends.

Still more preferably, an insulating member is attached at a position of the coil that is opposite to the end plates.

According to the present invention, the insulating member is attached at a position of the coil that is opposite to the end plates so as to improve the insulation between the end plates and coil ends.

BEST MODES FOR CARRYING OUT THE INVENTION

Figure 1:
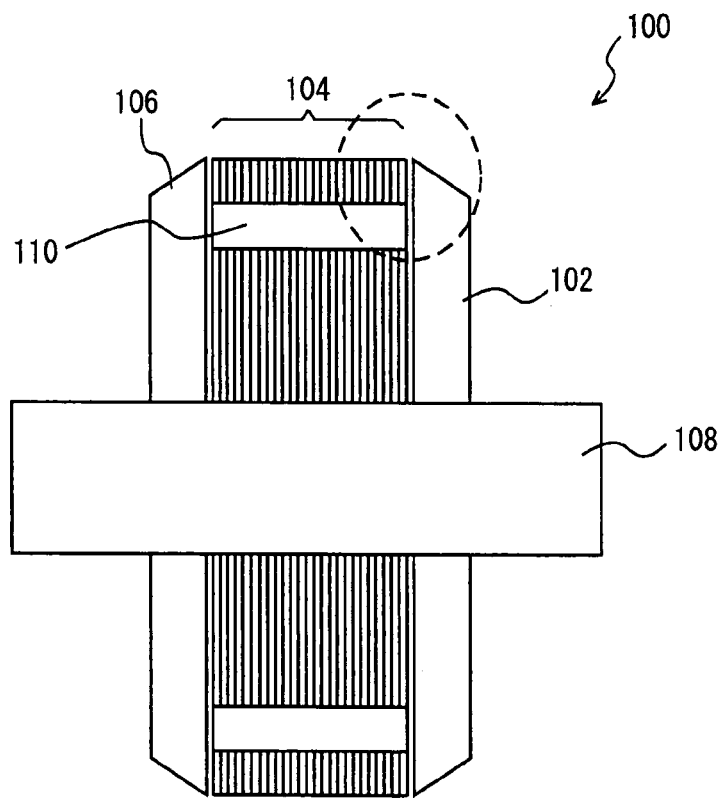
FIG. 1 shows a structure of a rotor of a rotating electric machine according to an embodiment of the present invention.

With reference to the drawings, a rotor structure of a rotating electric machine is hereinafter described according to an embodiment of the present invention. In the following description, like components are denoted by like reference characters, and these components are identically named and identically function. Therefore, a detailed description thereof is not repeated.

According to the present embodiment, the rotating electric machine is comprised of a rotor and a stator. As shown in FIG. 1, according to the present embodiment, a rotor 100 is made up of a shaft 108, a rotor core 104, endplates 102, 106, and a permanent magnet 110.

In the present embodiment, rotor core 104 is formed by stacking a plurality of electromagnetic steel plates. However, the rotor core is not limited to this particular one. Permanent magnet 110 is inserted into one of openings formed to be arranged in the circumferential direction of rotor core 104. End plates 102, 106 are disk-shaped and provided to sandwich rotor core 104 in the axial direction of shaft 108. End plates 102, 106 are made for example of an aluminum alloy. The material for the end plates, however, is not limited to the aluminum alloy under the condition that the material is a nonmagnetic material. Endplates 102, 106 are fastened for example so as to exert a force of holding the shape of rotor core 104 in the compressing direction along the rotation shaft.

Permanent magnet 110 is secured, with an adhesive, to at least one of rotor core 104 and end plates 102, 106. For example, permanent magnet 110 to which the adhesive is applied is inserted into the opening and thereafter heated to cure the adhesive. Accordingly, permanent magnet 110 is secured to one of rotor core 104 and end plates 102, 106. It is noted that the way to secure permanent magnet 110 is not particularly limited to the aforementioned fastening by means of the adhesive.

The present invention has the feature that end plates 102, 106 are each formed to have one end face closer to rotor core 104 and larger in outer diameter with its center at the rotation shaft, relative to the other end face. In the following, while the description is given of end plate 102 in the present embodiment, end plate 106 is shaped identically to end plate 102 and thus the detailed description thereof is not repeated.

Figure 2:
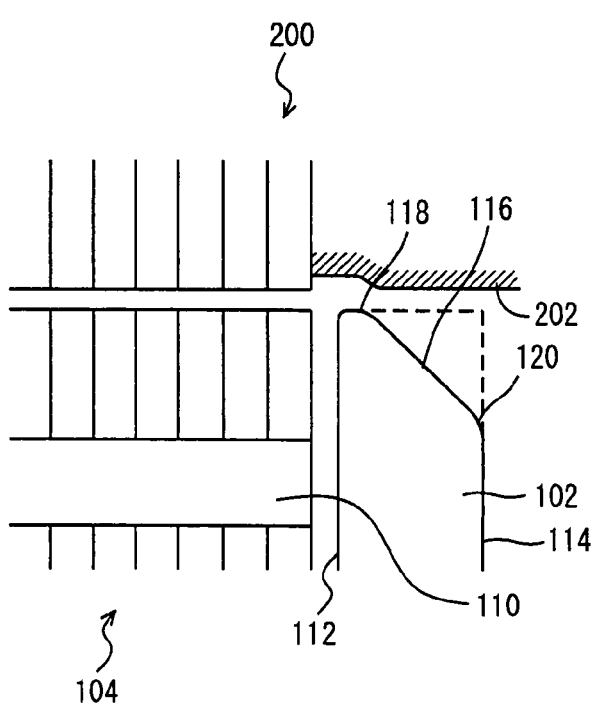
FIG. 2 is an enlarged view of the region enclosed by the dotted line in FIG. 1.

As shown in FIG. 2, a coil is wound around a core of stator 200 and a coil end 202 is formed. The outer diameter, which has its center at the rotation shaft, of the end face (1) 112 of end plate 102 that is relatively closer to rotor core 104 is larger than the outer diameter of the end face (2) 114. The outer diameter of end face (1) 112 is not limited to a particular diameter under the condition that this outer diameter is at least larger with respect to the circumferentially outermost position of the opening into which permanent magnet 110 is inserted. In the present embodiment, the outer diameter of end face (1) 112 is formed to be identical to the outer diameter of rotor core 104.

The shape of the portion between end face (1) 112 and end face (2) 114 is not limited to a particular shape under the condition that at least a predetermined distance from coil end 202 of the coil wound around the core of stator 200 can be maintained. In the present embodiment, for example, a curved surface is formed between these end faces where the outer diameter gradually changes. Specifically, end plate 102 has the shape of a partial cone formed by linearly connecting the outer rim of end face (1) 112 and the outer rim of end face (2) 114. It is noted that end plate 106 may have a shape formed by connecting the outer rim of end face (1) 112 and the outer rim of end face (2) 114 in the shape of an arc for example.

Here, "predetermined distance" is not limited to a particular distance under the condition that the distance does not deteriorate the insulation between coil end 202 of stator 200 and end plate 102. For example, "predetermined distance" is determined based on such factors as electric power to be applied to the rotating electric machine, the environment in which the rotating electric machine is used and the positional relation with other components. Further, regarding end plate 102, connecting portions 118, 120 that connect respective end faces (1) 112 and (2) 114 and the outer circumferential surface located between those end faces are each formed into a curved surface.

The rotor structure of the rotating electric machine of the present embodiment, based on the above-described structure, has the functions as described below.

Regarding end plate 102, the outer diameter of end face (1) 112 relatively closer to rotor core 104 is formed to be larger than the outer diameter of end face (2) 114. In other words, on each end of rotor 100, the outer diameter of end plate 102 with the center at the rotation shaft is relatively small. Thus, as compared with the case where the end plate is formed as indicated by the dotted line in FIG. 2 and accordingly the distance between the end plate and coil end 202 is shorter, the distance between end plate 102 and coil end 202 is increased. End plate 102 thus has at least a predetermined distance from coil end 202.

Further, the outer diameter of end face (1) 112 of the end plate is formed to be larger with respect to the circumferentially outermost position of the opening provided in rotor core 104. In the state where rotor core 104 is sandwiched between end plates 102, 106, a force in the compressing direction is exerted on the circumferentially inner portion of the rotor core with respect to the outer peripheral portion of end plate 102 while the force in the compressing direction is not exerted on the circumferentially outer portion of the rotor core with respect to the outer peripheral portion. Therefore, if the outer diameter of end plate 102 is smaller, the circumferentially outer portion of electromagnetic steel plates could be deformed to warp. Since openings are provided in the electromagnetic steel plates, the outer diameter of end face (1) 112 of end plate 102 is formed to be larger with respect to the circumferentially outermost position of the openings provided in rotor corer 104 so as to prevent deformation of the low-strength portion where the openings are formed in the electromagnetic steel plates.

In this way, regarding the rotor structure of the rotating electric machine according to the present embodiment, the disk-shaped end plates each have one end face (1) relatively closer to the rotor core and larger in outer diameter than the other end face (2) so as to make smaller the outer diameter of the end plate on the end of the rotor. Accordingly, the distance can be increased between each end plate and the coil end of the coil wound around the core of the stator provided opposite to the rotor. Thus, the end plate can be formed to have at least a predetermined distance from the coil end that does not deteriorate the insulation so as to ensure the insulation between the coil and the end plate. The rotor structure of the rotating electric machine that ensures the insulation between the end plates and the coil end can thus be provided.

Further, the outer diameter of one end face (1) of the end plate can be formed to be larger with respect to the circumferentially outermost position of the openings provided in the rotor core so as to prevent deformation of the low-strength portion of the electromagnetic steel plates where the openings are formed and accordingly exert the holding force on the end surfaces of the rotor core. In this way, the rotor structure of the rotating electric machine ensuring the force of holding the rotor core can be provided.

Furthermore, the portion between one end face (1) and the other end face (2) can be formed to have the outer diameter that gradually changes so as to form the end plates ensuring the distance that does not deteriorate the insulation with respect to the coil end and having strength necessary for holding the rotor core.

Moreover, the connecting portion between each of the end faces of the end plate and the outer circumferential surface between these end faces is formed to have a curved surface. If the aforementioned connecting portion between each of the end faces of the end plate and the outer circumferential surface between these end faces has a sharp edge, spark could be generated from the coil toward the sharp edge. Therefore, the connecting portions can be formed to have a curved surface so as to prevent spark from occurring. Accordingly, the insulating coating of the coil can be prevented from being peeling off due to heat generated by the spark.

Preferably, an insulating member 116 is attached to at least the outer rim of the end plate. In this way, the insulation between the end plates and the coil ends can be improved. For example, the end plate may be anodized or such an insulating coating as cationic coating may be applied to the end plates so as to attach the insulating member to the outer rim of the end plates.

Still preferably, an insulating member is attached at a position of the coil that is opposite to the end plate. In this way as well, the insulation between the end plates and the coil ends can be improved. For example, a piece of insulating paper can be provided at a position of the coil that is opposite to the end plates to improve the insulation between the end plates and the coil ends.

Still more preferably, in addition to the outer diameter of one end face (1) of the end plate, the outer diameter of the other end face (2) is preferably formed to be larger with respect to the circumferentially outermost position of the openings of rotor core 104. In this way, any deterioration in strength of the end plates in the region from at least the axial center to the circumferentially outermost position of the openings is prevented so as to maintain the force of holding the rotor core and the permanent magnet.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A rotor structure of a rotating electric machine having a rotor and a coil wound around a core of a stator, said rotor comprising a rotor core and disk-shaped end plates provided to sandwich said rotor core in the direction of a rotation shaft, wherein
said end plates are each formed to have a first end face closer to said rotor core and larger in outer diameter than a second end face, the first and second end faces being located on opposite sides of each end plate, each plate having a side face extending between said first end face and said second end face, and each end plate having curved connecting portions between each of said first and second end faces and the side face to prevent generation of sparks;
said rotor further comprises a permanent magnet inserted into each of openings formed to be arranged in the circumferential direction of said rotor core,
said end plates are each provided to cover the openings of said rotor core;
a gap formed between an outer periphery of each end plate and the stator to prevent deterioration of insulation between coil ends of the coil wound around the stator and the end plates,
wherein said end plates are each formed to have said second end face with its outer diameter larger with respect to the circumferentially outermost position of said openings,
wherein the side faces of said endplates have thicknesses that gradually decrease in a direction moving from the first end face to the second end face so as to form an angle to prevent generation of sparks, and
wherein the coil ends of the coil wound around the stator protrude toward the rotor.

2. The rotor structure of a rotating electric machine according to claim 1, wherein
said rotor core is formed by stacking a plurality of electromagnetic steel plates.

3. The rotor structure of a rotating electric machine according to claim 1, wherein
an insulating member is attached to an outer rim of said end plates.

4. The rotor structure of a rotating electric machine according to claim 1, wherein
an insulating member is attached at a position of said coil that is opposite to said end plates.

5. A rotor structure of a rotating electric machine having a rotor and a coil wound around a core of a stator, said rotor comprising a rotor core and disk-shaped end plates provided to sandwich said rotor core in the direction of a rotation shaft, wherein
said end plates are each formed to have a first end face closer to said rotor core and larger in outer diameter than a second end face, the first and second end faces being located on opposite sides of each end plate, each plate having a side face extending between said first end face and said second end face, and each end plate having curved connecting portions between each of said first and second end faces and the side face to prevent generation of sparks;
said rotor further comprises a permanent magnet inserted into each of openings formed to be arranged in the circumferential direction of said rotor core,
said end plates are each provided to cover the openings of said rotor core; and
a gap formed between an outer periphery of each end plate and the stator to prevent deterioration of insulation between coil ends of the coil wound around the stator and the end plates,
wherein an insulating member is attached to an outer rim of said end plates,
wherein said end plates are each formed to have said second end face with its outer diameter larger with respect to the circumferentially outermost position of said openings,
wherein the side faces of said endplates have thicknesses that gradually decrease in a direction moving from the first end face to the second end face so as to form an angle to prevent generation of sparks, and
wherein the coil ends of the coil wound around the stator protrude toward the rotor.

6. The rotor structure of a rotating electric machine according to claim 5, wherein
said rotor core is formed by stacking a plurality of electromagnetic steel plates.

7. A rotor structure of a rotating electric machine having a rotor and a coil wound around a core of a stator, said rotor comprising a rotor core and disk-shaped end plates provided to sandwich said rotor core in the direction of a rotation shaft, wherein
said end plates are each formed to have a first end face closer to said rotor core and larger in outer diameter than a second end face, the first and second end faces being located on opposite sides of each end plate, each plate having a side face extending between said first end face and said second end face, and each end plate having curved connecting portions between each of said first and second end faces and the side face to prevent generation of sparks;
said rotor further comprises a permanent magnet inserted into each of openings formed to be arranged in the circumferential direction of said rotor core,
said end plates are each provided to cover the openings of said rotor core;
a gap formed between an outer periphery of each end plate and the stator to prevent deterioration of insulation between coil ends of the coil wound around the stator and the end plates,
a coil is wound around a core of said stator, and
an insulating member is attached at a position of said coil that is opposite to said end plates,
wherein said end plates are each formed to have said second end face with its outer diameter larger with respect to the circumferentially outermost position of said openings,
wherein the side faces of said endplates have thicknesses that gradually decrease in a direction moving from the first end face to the second end face so as to form an angle to prevent generation of sparks, and
wherein the coil ends of the coil wound around the stator protrude toward the rotor.

8. The rotor structure of a rotating electric machine according to claim 7, wherein
said rotor core is formed by stacking a plurality of electromagnetic steel plates.

* * * * *